United States Patent [19]

Hallett et al.

[11] Patent Number: 5,050,511

[45] Date of Patent: Sep. 24, 1991

[54] PROCESS FOR THE DESTRUCTION OF ORGANIC WASTE MATERIAL

[75] Inventors: Douglas J. Hallett, Acton; Kelvin R. Campbell, Guelph, both of Canada

[73] Assignee: 655901 Ontario Inc., Rockwood, Canada

[21] Appl. No.: 631,847

[22] Filed: Dec. 21, 1990

Related U.S. Application Data

[63] Continuation of Ser. No. 481,197, Feb. 20, 1990, abandoned, which is a continuation-in-part of Ser. No. 335,481, Apr. 10, 1989, abandoned, which is a continuation-in-part of Ser. No. 82,452, Aug. 5, 1987, Pat. No. 4,819,571.

[51] Int. Cl.[5] .............. F23G 7/00

[52] U.S. Cl. .............. 110/346; 110/229; 110/234; 110/215; 48/197 A; 48/111

[58] Field of Search .............. 110/234, 235, 237, 238, 110/250, 246, 245, 208, 210, 211, 214, 215, 216, 229; 48/197 A, 111, 65

[56] References Cited

U.S. PATENT DOCUMENTS

| | | | |
|---|---|---|---|
| 2,607,667 | 8/1952 | Stalhed et al. | 48/65 |
| 4,230,053 | 10/1980 | Deardorff et al. | 110/346 |
| 4,301,137 | 11/1981 | Williams et al. | 423/481 |
| 4,316,878 | 2/1982 | Akune et al. | 110/238 |
| 4,463,691 | 8/1984 | Meenan et al. | 110/346 |
| 4,474,121 | 10/1984 | Lewis | 110/346 |
| 4,481,891 | 11/1984 | Takeshita et al. | 110/238 |
| 4,628,837 | 12/1986 | Mori et al. | 110/346 |
| 4,631,183 | 12/1986 | Lalancette et al. | 110/237 |
| 4,655,968 | 4/1987 | Quieser et al. | 110/250 |
| 4,848,249 | 7/1989 | Le Pori et al. | 110/229 |

FOREIGN PATENT DOCUMENTS

| | | | |
|---|---|---|---|
| 1551838 | 6/1970 | Fed. Rep. of Germany . | |
| 21916 | 2/1984 | Japan | 110/346 |
| 232947 | 12/1984 | Japan | 110/237 |
| 186 | 6/1982 | PCT Int'l Appl. . | |
| 2159134 | 11/1985 | United Kingdom . | |

OTHER PUBLICATIONS

RGE Revue Generale De L'Eletricite No. 8, Sep. 1987, pp. 156–162, Paris, France, J. P. Groo: "Destruction des PCB: Procedes En Cours De Developpement".

Environment Canada, Economic and Technical Review, Report EPS, 3-EC-83-1, "Destruction Technologies for Polychlorinated Biphenyls", Feb. 1983, pp. 32–35, Ottawa, Canada.

Chemistry and Industry, vol. 102(19), Oct. 3, 1983, pp. 759–760, Letchworth Herts, R. Louw et al., "Thermal Hydrodechlorination of (Poly)Chlorinated Organic Compounds".

*Primary Examiner*—Henry A. Bennett

*Assistant Examiner*—Denise L. F. Gromada

*Attorney, Agent, or Firm*—Blake, Cassels & Graydon

[57] ABSTRACT

A system for the destruction of organic waste material such as halogenated organic compounds, and related matter. In one embodiment the waste material is reduced with a gaseous reducing agent such as hydrogen above about 600° C., the gaseous products are condensed and cooled in the presence of an aqueous mist at about 5° C., and condensed organic and aqueous material is collected and the aqueous portion recycled into the condensing and cooling steps. In another embodiment, where acid gases (for example, hydrogen halides) are produced during reduction, the gaseous products are condensed in the presence of aqueous mist at about 85° C. and a major portion of the aqueous mist condenses as acidic water which is collected and neutralized. Remaining gaseous components are then cooled to about 5° C. as in the previous embodiment. In further embodiments, the remaining uncondensed gaseous products are oxidized with a gaseous oxidizing agent at a temperature above about 1000° C. The process thus allows destruction of organic waste, recovery of reduced products, and oxidation of unrecovered products. The system includes a reduction vessel wherein hydrogen is used directly in intimate mixing relation with pulverized waste material, and after completion of a residence time sufficient to reduce the organic compounds, the gaseous by-products pass to an adjacent acid recovery and neutralization vessel and/or reduced product recovery vessel and combustor.

67 Claims, 8 Drawing Sheets

201
25
23
27
203
21
20
LIQUID
50

56
14
60
65
61
62
62
62
AIR
54
32
10
22
22
67
69
95
50
PUMPS
40

92
10/14
90
60
67
WASTE FEED LINE
95

188
186
190
184
176
170
180
172
182
116
174

104
114
WATER
150
152
154
156
158
159

PROCESS FOR THE DESTRUCTION OF ORGANIC WASTE MATERIAL

RELATED APPLICATION

This application is a continuation of application Ser. No. 481,197, filed Feb. 20, 1990, now abandoned, which was a continuation-in-part of application Ser. No. 335,481, filed Apr. 10, 1989, and entitled "PROCESS FOR THE DESTRUCTION OF ORGANIC WASTE MATERIAL", now abandoned, which was a continuation-in-part of application Ser. No. 082,452, filed Aug. 5, 1987, under the same title, now U.S. Pat. No. 4,819,571, issued Apr. 1, 1989 under the same title.

BACKGROUND OF THE INVENTION

This invention relates to a system for the destruction of organic waste material and more particularly it relates to a process for the destruction of organic waste material which may or may not contain polyhalogenated waste material, and to apparatus for carrying out the process.

It is known to destroy halogenated organic waste material by reduction procedures using, for example, sodium metal or sodium napthalide. It is also known to destroy halogenated organic waste material by oxidation, using, for example, high temperature incineration. These known processes have certain limitations or disadvantages in that they can only be used for particular kinds of waste material. Moreover, the chemical reagents used for the destruction are sometimes hazardous to handle and the destruction may lead to the formation of highly toxic by-products.

The dimensions of the problem relating to the disposal of polyhalogenated liquids, particularly polychlorinated biphenyls (known generally, and to the public as PCBs) and associated wastes have been reviewed in the Environment Canada Economic and Technical Review Report EPS 3-EC-83-1. Bearing in mind the suspected carcinogenic nature of PCBs and the apparent absence of degradation in nature, over extremely long time periods, the identified quantities of PCBs presently in use in electrical transformers and capacitors (Table 7 of the Report), comprising a mass value of 14.8 million kilograms, conveys some idea of the scale of the problem.

Furthermore, the accumulation of these materials in numerous localities, mostly remote from the existing large-scale incinerators available in the U.S. and Canada for disposal purposes further emphasizes the extreme nature of the problem. Public awareness to the potential danger of PCBs to public health also further complicates the situation in precluding transportation thereof to existing combustion facilities. The occurrence of certain, well-publicized, PCB spills has further exacerbated this aspect of the problem.

The existing method of disposing of these types of substance has been by incineration, in large installations. While claims have been made to the achievement of very high percentile effectiveness of disposal by this method, there is concern that the reports may prove less than valid, on a long-term, continuing basis. In addition incineration or oxidation will form highly toxic by-products such as chlorinated dioxins if operated outside of exact optimal temperatures and residence time requirements.

One identified problem, referred to at Page 28 of the above-noted Report, which contributed to the demise of the related PCB incinerator, was the formation of a ring of "agglomerated material" during incineration. This type of "glop" formation may well be a characteristic by-product of incineration systems, and possibly is indicative of partial recombinations of molecules into ring compounds of a suspect type. This constitutes a further reason for providing a changed process.

Pyrolysis or starved air thermal destruction or degradation of solid and liquid organic waste products of hydrocarbons has previously been hampered by the formation of tars and polynuclear aromatic hydrocarbons containing from one to five aromatic rings. This invention includes the addition of gaseous reducing agents, particularly hydrogen, in concentrations sufficient to saturate or reduce the molecules produced such that polyaromatic structures are eliminated as by-products of the intended reaction.

SUMMARY OF THE INVENTION

In a first embodiment, the invention comprises a treatment process for organic waste material. The organic waste material is reduced in the presence of a gaseous reducing agent and the reduced material is subsequently subjected to a cooling step in the presence of water a condensed liquid aqueous material thus forming. A portion of this aqueous material is recycled into the cooling step while a major portion of the cooled reduced material is available for subsequent recovery or further treatment.

We have found according to a second embodiment of the invention that organic waste material can be destroyed efficiently and completely by use of a process which combines a gas phase chemical reduction in a reducing atmosphere at a high temperature followed by oxidation of the hot reaction mixture from said chemical reduction in a high temperature incinerator.

It is possible to subject certain waste materials to reduction processes and to subsequently recover reduced products.

It is advantageous to pre-heat waste material to be reduced before its introduction into an isolated reduction zone.

It is possible to capture, through the use of a heat exchanger, energy released during recovery steps and to use the energy to pre-heat unrecovered materials to be oxidized in a later step.

In an alternative embodiment, pre-heating means is provided within an isolated pre-heating zone by an $O_2$/fuel burner prior to entry of waste materials to the reduction zone.

It is possible to capture, through t he use of a heat exchanger, energy released during the oxidation step and to transfer the energy to the waste material for pre-heating prior to subjecting it to the reduction process.

According to the invention, we provide a process for the destruction of organic waste material which comprises subjecting said waste material to chemical reduction with a gaseous reducing agent at a temperature above about 600° C. and thereafter subjecting the hot reaction mixture thus obtained to oxidation with a gaseous oxidizing agent at a temperature above about 1000° C. As a further feature of the invention, we provide a process for the destruction of organic waste material which comprises subjecting the waste material to reduction with a gaseous reducing agent at a temperature of from about 700° C. to about 900° C., the reduction being effected over a residence time of from about 0.1 seconds to about 10 seconds and thereafter subjecting the hot reaction mixture thus obtained to oxidation with a gaseous oxidizing agent at a temperature of from about 1000° C. to about 1400° C., the oxidation being effected over a residence time of from about 1 second to about 4 seconds.

The process of this invention may, for example, be conveniently carried out by the direct injection of organic waste material, for example, halogenated organic waste material in the form of a gas, a liquid, a pumpable sludge, a fine particulate slurry such as contaminated sediment/water mixtures, or a pulverized solid, upwardly into a pressurized reaction vessel, in the absence of oxygen. The reaction vessel is heated and maintained at temperatures above about 600° C., preferably at a temperature of from about 700° C. to about 900° C.

Another embodiment incorporates the use of a reduction vessel of generally circular horizontal cross-section and having a centrally located ceramic tube with an outlet of the vessel located above the aperture of the tube. Waste and a gaseous reducing agent are introduced with intimate mixing at the upper perimeter of the vessel. This arrangement provides a baffling effect. Once introduced into the upper region of the vessel, gaseous wastes must travel to the lower region, through the holes of the tube and upwardly through the tube and aperture in order to reach the next zone provided by the apparatus. A reduction vessel having a tube as a part thereof and an upper inlet thus provides a greater necessary travel distance for gaseous waste and a greater vessel surface area with which such waste may come into contact. Organic material contained in solid waste may be volatized when it strikes a hot vessel surface. In such an embodiment, a flow of water may be provided through the bottom of the vessel to trap particulate matter and carry it to a collection tank. A steady flow of gaseous reducing agent may also be provided in the lower region of the vessel above the flow of water to hinder gaseous waste from contact with water stream.

Waste may be co-injected with a gaseous reducing agent such as hydrogen, gaseous ammonia, natural gas, methane, propane or water vapor, or a mixture of such reducing agents. The reduction may be carried out with or without the addition of a metal catalyst such as iron, zinc, tin or nickel in the form of iron filings or powdered zinc, tin or nickel which may be co-injected into the vessel to promote the reduction reaction.

In one aspect, the invention comprises the steps of co-injecting (on a continuous basis) the waste, with hydrogen, into a pre-heated reduction vessel, maintaining the vessel at an internal pressure above atmospheric, up to one atmosphere above ambient, without the addition of catalyst materials.

It is also preferable to pre-heat waste material to be injected into the reduction vessel.

The reaction vessel can be arranged and the rate of injection may be adjusted, such that the residence time of gaseous material in the reduction vessel is greater than about 0.1 seconds and preferably from about 5 seconds to about 10 seconds. A particularly effective residence time in which to effectively complete the reduction is about 5 seconds.

The reduction may be carried out at a temperature of from about 600° C. to about 1100° C., preferably within the range of from about 700° C. to about 900° C. and particularly at a temperature of from about 800° C. to about 900° C.

The reduction may also be carried out in the presence of a metal, such as an iron, nickel, zinc or tin catalyst. The catalyst may be in the form of iron filings, powdered nickel, powdered zinc or powdered tin.

The organic waste material may or may not contain organic compounds such as halogenated biphenyls, halogenated benzenes, halogenated phenols, halogenated cycloalkanes, halogenated alkanes, halogenated alkenes, halogenated dioxins and halogenated dibenzofurans. For example, the organic waste material may contain commonly used chlorinated organic compounds such as chlorinated biphenyls, also known as polychlorinated biphenyls (PCBs), chlorinated benzenes, chlorinated phenols, chlorinated cycloalkanes, chlorinated alkanes, chlorinated alkenes, chlorinated dioxins and chlorinated dibenzofurans.

The organic waste material may be in the form of a liquid, a pumpable sludge, a fine particulate slurry such as contaminated sediment/water mixtures, or a pulverized or shredded solid such as contaminated wood waste or soils. Such waste material may include, for example, oils containing polychlorinated biphenyls (PCBs) a waste products from capacitor and transformer manufacturing processes, or from obsolete electrical or non-electrical equipment, and products used in various industries as plasticizers, hydraulics fluids and lubricants.

The organic waste material may also be such that it contains non-halogenated organic compounds. It may, for example, be in the form of shredded or particulate organic solid material, such as shredded pathogenic waste material.

The reaction vessel for the reduction stage of the process is lined with suitable chemical and thermal resistant materials to withstand gaseous by-products generated, such as hydrogen halides, for example, hydrogen chloride. It may also be fitted with a clean-out auger to remove solid debris or by-products, such as metals, metal salts, silicates or other solid matter, which accumulates in the vessel.

While gaseous reducing agents such as gaseous ammonia are less costly and also potentially less explosive than hydrogen, methane or propane, certain advantages are obtained with these latter reducing agents. However, while the use of gaseous hydrogen is Preferred for a number of reasons, it is contemplated that propane may be used if the BTU content of the waste is potentially too low for proper oxidation to take place. More preferably, hydrogen is used for the reduction and propane is added during oxidation.

The us of a reducing vessel and selection of gaseous hydrogen as the reducing agent has many beneficial and optimizing effects. Thus, in the case of one embodiment, a road-mobile system for the on-site destruction of accumulated PCBs and other halogenated wastes, the utilization of hydrogen minimizes the necessary size of the reducing vessel for carrying out a continuous process and the potential for production of carbon. Reduction of PCBs or hazardous waste to gaseous fuel further reduces the necessity of additional fuel and the additional required combustion air for the fuel, therefore greatly reducing the size of the secondary incinerator and overall destruction apparatus.

The safety requirements for the reduction vessel involve the use of a multiple purge by inert gas, such as nitrogen, to ensure the absence of oxygen (by way of air) within the vessel, so as to preclude the likelihood of explosion. As the process is generally proposed to be a continuous process, the purging requirement becomes proportionately less onerous.

In the second preferred embodiment, having the reduction vessel directly connected with the combustor, both of the vessels are initially thus purged. In view of the desirability of operating the reduction vessel directly adjacent to, and preferably in direct connection with a high temperature oxidizing zone (the combustor), the reduction zone is maintained at a pressure sufficiently higher than that within the combustor as to warrant no flow-back of oxidizing agents, including air, from the combustor, into the reduction vessel. Furthermore, in certain embodiments, the arrangement of the reduction zone has the mixing nozzles, wherein the pressurized reducing gas mixes intimately with and atomizes the incoming waste by high velocity impact therewith, located at a low level within the zone, and a gaseous residence zone containing reduced gaseous products located thereabove, so as to isolate the reduction zone from the outlet to the oxidation zone. This interface zone between reduction and oxidation may include a ceramic firestop to prevent flash backs. The hot reduced gas is introduced into the oxidation zone through a combustion mantle, combustion nozzles or suitable apparatus to allow adequate mixing with the combustion air introduced into the oxidation zone and to allow optimal positioning of the flame front within the oxidation chamber.

A further advantage of utilizing hydrogen, generally in gaseous form, is the capability of utilizing a jet or jets of hydrogen in impacting relation with the substances being reduced, so as to achieve a highly active mixing zone wherein the as-supplied state of the hydrogen is utilized in order to optimize the mixing efficiency, and the reduction process.

In the case of fluid waste, a jet of the waste can be impacted by a transversely directed jet of hydrogen, to effect atomization with intimate mixing, to promote the chemical effectiveness of the reduction process.

One embodiment incorporates the use of a radially inward gas cross-flow nozzle of the CALDYN (TM) type. The subject system is capable of handling fluid waste incorporating particles up to one-quarter inch mesh size therein, and droplets sized down to as small as forty microns (40) can be economically obtained.

It is to be understood that the reduction may also be carried out in the presence of water vapor which does not inhibit the reduction reaction. Thus, it is possible to destroy organic waste material, sludges or sediments, such as contaminated harbour sludges or sediments, containing substantial quantities of water.

The hot reaction mixture from this reduction procedure will generally be dehalogenated, hydrogenated or reduced hydrocarbons or substantially dehalogenated hydrocarbons together with hydrogen halide, such as hydrogen chloride, water and excess hydrogen.

The reaction vessel to be used for the reduction in the second preferred embodiment is vertically interfaced with a second vessel to be used for the second, oxidation phase. The hot reaction mixture from the reduction stage, at a temperature of from about 600° C. to about 1000° C., and more particularly from about 800° C. to about 900° C., may be forced through a short insulated ceramic or refractory lined tube by convection and the pressure created as a result of evaporation and volatilization of the injected liquid o partially liquid waste together with continuous expansion of the gases as the reduction breakdown occurs. Excess air or oxygen can be introduced into the second vessel in such a way as to create a turbulent flow of hot gases of the hot reaction mixture together with oxygen which will promote the complete combustion of those gases at a temperature of above about 1000° C. Particularly useful temperatures are those within the range of about 1000° C. to about 1500° C. and especially a temperature of from about 1200° C. to about 1400° C.

The size of the second vessel for the oxidation procedure may be such that the retention or residence time of the hot reaction mixture in the combustion chamber will be from about 1 second to about 4 seconds, preferably for a residence time of about 2 seconds, or more. The combustion chamber of the second vessel may also be lined with suitable material to withstand the hot acidic gases, such as hydrogen chloride, which will pass through it. The hot emission from this second vessel is then rapidly cooled and scrubbed with water and aqueous alkali such as sodium hydroxide mist or sodium carbonate in order to remove and neutralize the acidic gases.

It may be depending upon the waste material, that it is preferable to recover a substantial portion of the initially reduced products.

In one embodiment of the invention, products of the reduction step are cooled in the presence of aqueous mist injected into the flow path of the gaseous reduction products. In a subsequent step, gaseous remains may be further cooled, condensed to a second liquid and collected before the oxidation step of any material which still remains in gaseous form.

One initial reduction product, if the starting waste material contains halogenated organic material, is a hydrogen halide gas, which will largely dissociate when dissolved in the initially collected aqueous liquid, making it acidic. Such initially collected acidic liquid may thus be neutralized in the presence of a base such as sodium bicarbonate, calcium carbonate, sodium hydroxide or other suitable basic material.

Depending upon the starting material, and conditions under which the process is carried out, a second liquid portion having a generally lower liquification temperature than the first may be subsequently collected. If, for example, the starting waste material contained substantial amounts of chlorobenzene, a second liquid containing substantial amounts of organic material including the reduced product benzene may be collected. In such an instance, a substantial amount of the second liquid may also contain water which was not collected as part of the first liquid. The water, or a large part thereof, if it forms a separate layer or phase from the organic material may be separated removed and recycled for use as aqueous mist in the initial cooling of products of the reduction step.

The gaseous material remaining after the second cooling may then be transferred to an oxidation zone. Material for oxidation is preferably pre-heated before introduction to oxidation conditions. In certain embodiments, a heat exchange process is used to capture and transfer energy released or removed during the second cooling step to aid in the pre-heating of material to be oxidized. Such a heat exchange process may be sufficient on its own for the heating step prior to oxidation.

A demisting step may be used prior to the pre-heating process in order to ensure that all condensed materials are removed from the remaining gaseous material.

In certain embodiments, a heat exchange process is used to transfer energy liberated during the oxidation process to the waste pre-heating step prior to reduction. This transfer is preferably achieved by heating water, which may form into steam, in a closed zone. The heated water or steam may be circulated within its closed zone from the oxidation zone to the waste pre-heating zone and back again to effect pre-heating of waste material.

As described previously, it is usually preferable to introduce the reducing agent and waste through a nozzle such that they are intimately mixed. Where it arises that it is inconvenient to introduce the waste through a nozzle the waste material may be, as an alternative, initially introduced to a bath of molten vitrification material which provides a pre-heating of the waste before entry into the reduction chamber. An example of material used in the vitrification of incinerator ash is molten silica. In such an aspect of the invention, the waste material to be reduced vaporizes from the molten material and is subsequently reduced by a gaseous reducing agent which is introduced separately and above the vitrification material.

The invention is illustrated in principle by, but not limited to, the following examples:

EXAMPLE 1

1 Molar equivalent of polychlorinated biphenyl (Arochlor TM 1248) was reacted with 22 molar equivalents of hydrogen in a first reaction chamber at a temperature of 875° C. and 1 atmosphere gauge during a reaction period of about 30 seconds. This reaction produced 99.9% destruction and the gaseous reaction mixture thus obtained contained hydrogen chloride, benzene, biphenyl and chlorobenzenes. This gaseous reaction mixture was then passed through an interfacing tube at 875° C. into a second reaction chamber where oxidation could take place. A 5% excess of pre-heated air was then mixed with the gaseous reaction mixture in the second reaction chamber and oxidation was completed at a temperature of 1000° to 1200° C. during a residence time of 2 seconds. This oxidation of the gaseous reaction mixture was effective in completing oxidation of the remaining reactants in the mixture.

EXAMPLE 2

9 Molar equivalents of monochlorobenzene and 2 molar equivalents of 1,2,4-trichlorobenzene were reacted with 21 molar equivalents of hydrogen in a first reaction chamber at a temperature of 925° C. and 1 atmosphere pressure during a reaction time of 30 seconds. The reaction produced 99.95% dehalogenation of the chlorobenzenes. This gaseous reaction mixture was then passed through an interfacing tube at 875° C. into a second reaction chamber where oxidation could take place.

A 5% excess of pre-heated air was then mixed with the gaseous reaction mixture in the second reaction chamber and oxidation was completed at a temperature of 1000° C. to 1200° C. during a residence time of 2 seconds. This oxidation of the gaseous reaction mixture was effective in completing oxidation of the remaining reactants in the mixture.

EXAMPLE 3

1 Molar equivalent of chloroform was reacted with 10 moles of water vapor at 950° C. at 1 atmosphere of pressure in a first reaction chamber during a reaction time of 30 seconds. This reaction caused 99.9% dehalogenation of chloroform. This gaseous reaction mixture was then passed through an interfacing tube at 875° C. into a second reaction chamber where oxidation could take place. A 5% excess of pre-heated air was then mixed with the gaseous reaction mixture in the second reaction chamber and oxidation was completed at a temperature of 1000° C. to 1200° C. during a residence time of 2 seconds. This oxidation of the gaseous reaction mixture was effective in completing oxidation of the remaining reactants in the mixture.

EXAMPLE 4

A 0.44% solution of hexachlorobenzene in hexane was passed through a tubular reaction chamber at a rate of 1.8 millimoles per minute of hexane together with hydrogen at a rate of 17 millimoles per minute and water at a rate of 28 millimoles per minute for a 60 minute period. The reactor temperature was maintained at 1000° C. at the injection end, 950° C. in the middle, and 900° C. at the exit end, and the average residence time was 3.3 seconds. The reaction products were captured in a condensing flask at the reaction tube exit followed by an XAD7 resin cartridge. The flask and tube contents were analyzed for hexachlorobenzene and chlorobenzenes, and the destruction removal efficiency for both hexachlorobenzene and total chorobenzenes was found to be 99.999%. The products of the reaction were methane, hydrogen chloride, benzene, and chlorobenzenes. The specific chlorobenzenes detected included 1,2,3,4-tetrachlorobenzene, pentachlorobenzene and hexachlorobenzene. In other tests, chlorobenzenes found also included monochlorobenzene, 1,2-dichlorobenzene, 1,3-dichlorobenzene, 1,4-dichlorobenzene, 1,2,3-trichlorobenzene 1,2,4-trichlorobenzene, 1,3,5-trichlorobenzene, 1,2,3,5-tetrachlorobenzene, and 1,2,4,5-tetrachlorbenzene. Water was recovered from the products of each reaction in a quantity similar to that introduced.

The foregoing examples constituted laboratory feasibility tests, to establish effectiveness and residence times.

In carrying out the present invention at an effective production level, it is necessary to provide a reduction chamber suitably pre-heated to a reaction sustaining temperature.

In view of the advantages that obtain by use of hydrogen, as previously set forth, and the imperative need to provide an effective gaseous purge, the pre-heating of the subject vessel is preferred by way of passive heating means, such as electrical heating elements, as opposed to active heating methods, such as gas combustion. Owing to the highly active chemicals generally evolved from the subject process, the use of protective, chemically resistant vessel linings is important. This requirement and the use of radiant heat are not incompatible.

The use of steam or superheated steam as both a purge gas and as the pre-heating agent, is contemplated.

The present invention thus provides a system for the reduction and subsequent oxidation of organic waste materials, the system having a reducing vessel for the chemical reduction of the waste materials therein, first gas entry means for admitting a purge gas within the vessel in air purging relation thereto, to provide an oxygen-free environment within the vessel; pre-heating means for raising the temperature within the vessel above a predetermined minimum reduction temperature for a predetermined group of the organic waste material; feed means for feeding the organic waste material in a feedable form into the vessel within a localized mixing zone therein; fluid admission nozzle means for admitting a reducing fluid in directed intimate mixing relation with the waste material in the mixing zone, whereby the waste material is effectively reduced to a form including combustible gaseous components therewith.

The system further provides a combustion chamber to receive the combustible gaseous products for combustion therein.

In one embodiment, the combustion chamber is superposed over the reduction vessel, to receive the gases therefrom in upward flowing relation, through a central passage, equipped with a ceramic fire stop to prevent flash back. The hot reduced gas is introduced into the oxidation zone through a combustion mantle, combustion nozzles or other suitable apparatus to promote mixing with the combustion air being admitted to the oxidation zone, and provide optimal positioning of the flame front within the oxidation chamber.

The system further provides flue gas treatment means to handle the highly acidic flue gas by way of an alkaline scrub down, prior to release to the atmosphere.

A control system, not forming a part of the present invention, provides an automated control, in order to monitor and maintain appropriate feed rates of the process constituents, and safe and suitable environmental conditions for the respective stages of the process.

BRIEF DESCRIPTION OF THE DRAWINGS

Certain embodiments of the invention are described, reference being made to the accompanying drawings, wherein.

DETAILED DESCRIPTION OF THE PREFERRED EMBODIMENTS

Figure 1:
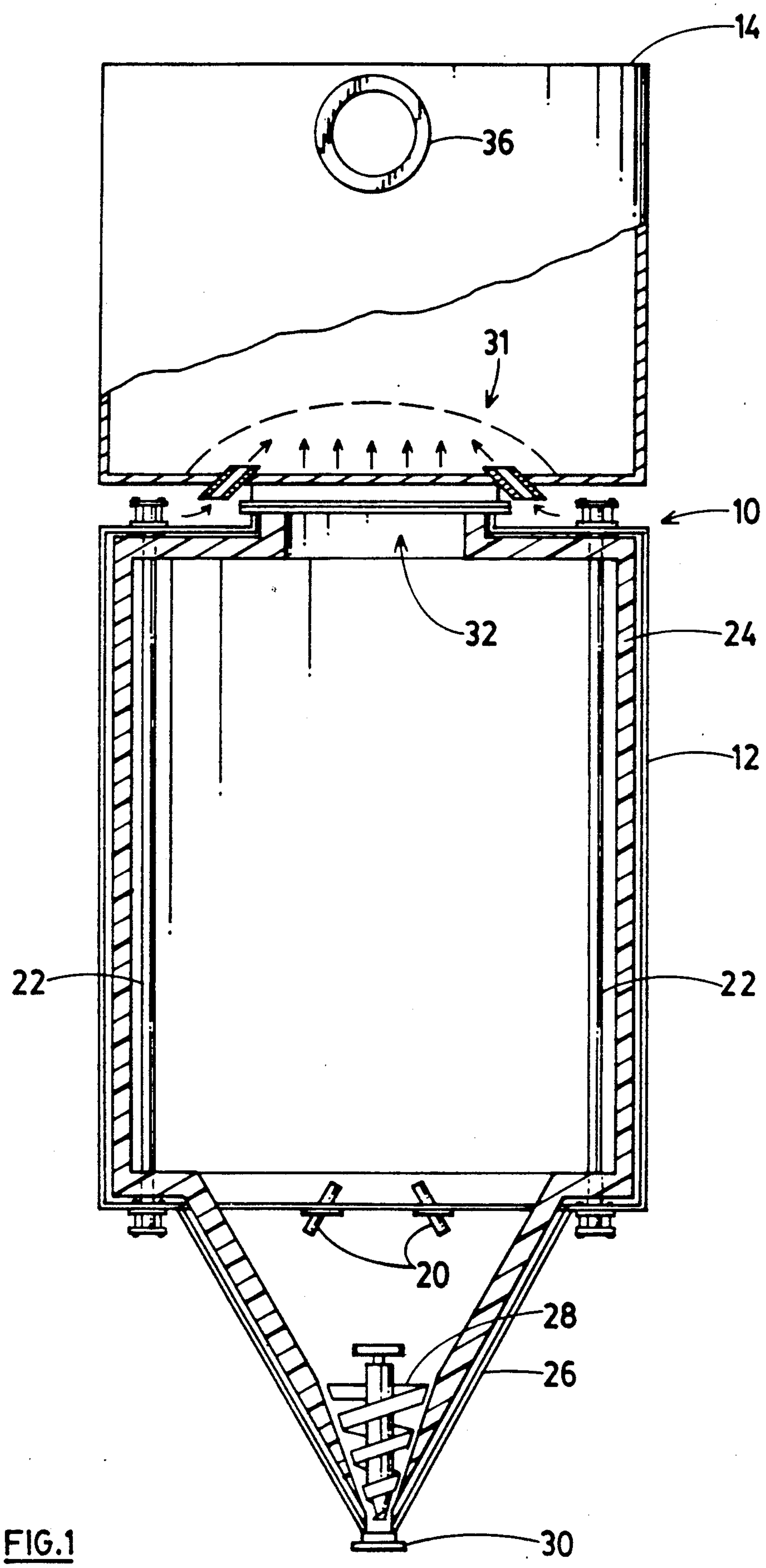
FIG. 1 is a schematic elevation, in diametrical section, of a reduction chamber; combined with a combustor, shown partly sectioned.

Referring to the embodiment illustrated by FIG. 1, the reduction vessel 10 for carrying out a reduction process has a metal shell 12 and is substantially free-standing, having a combustion chamber 14 mounted thereon.

The reduction vessel 10 has one or more inlet nozzles 20 (see FIG. 2) for injecting waste, including pulverized solids, for atomization of the liquid portion thereof by jets of hydrogen gas through an annulus of nozzles 27.

The vessel 10 has a bank of radiant electrical heaters 22 of known commercial type such as Carborundum silicon carbide glow bar heaters lining the walls thereof. Chemically resistant FIBERFRAX (TM) ceramic thermal insulation 24 protects the shell 12, while also ensuring a safe working thermal environment in the locality of the vessel 10.

A bottom portion 26 of shell 12 includes an auger 28, and a sealed outlet 30 whereby cleaning out of solid inorganic residues can be effected.

A passage 32 connects vessel 10 with vessel 14 for upward passage therethrough of the reduced gaseous products. The passage 32 is Positioned and sized to allow the pressure within vessel 10 to be controlled, in order to ensure a safe, positive pressure differential between reduction chamber 10 and combustion chamber 14. A blow-out panel (not shown) safeguards the vessel 10 against explosive over pressure.

An air supply nozzle and combustion grid combination 31 ensures safe and stable combustion within chamber 14.

Figure 2:
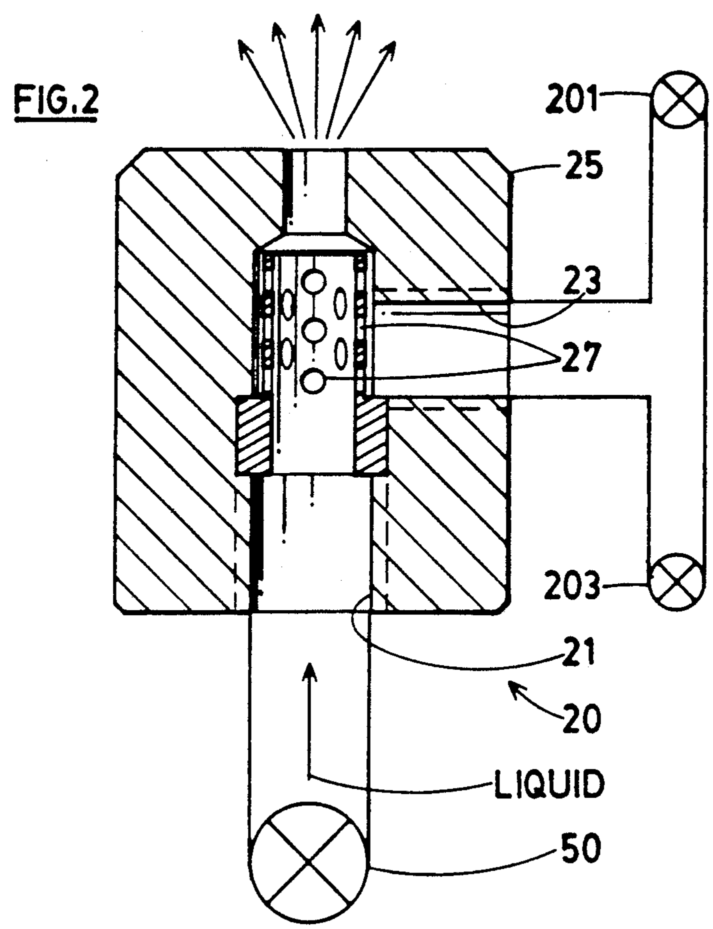
FIG. 2 is a scrap view, in diametrical section, of an atomizing nozzle portion of the reduction apparatus.

Referring to FIG. 2, the nozzles 20, positioned as shown in FIG. 1, each have a liquid inlet 21 and a gaseous inlet 23. The gaseous inlet 23 connects, by way of control valves 201, 203 with respective pressurized nitrogen and pressurized hydrogen supplies (not shown), for use in initially purging the combined vessel 10/14, and for subsequently operating the chemical reduction process, respectively.

The exhaust opening 36 of chamber 14 connects with an acidic gas scrubber and centrifugal fan or particulate removal apparatus 61, particularly in view of the hydrogen chloride content of the exhaust gases.

Figure 3:
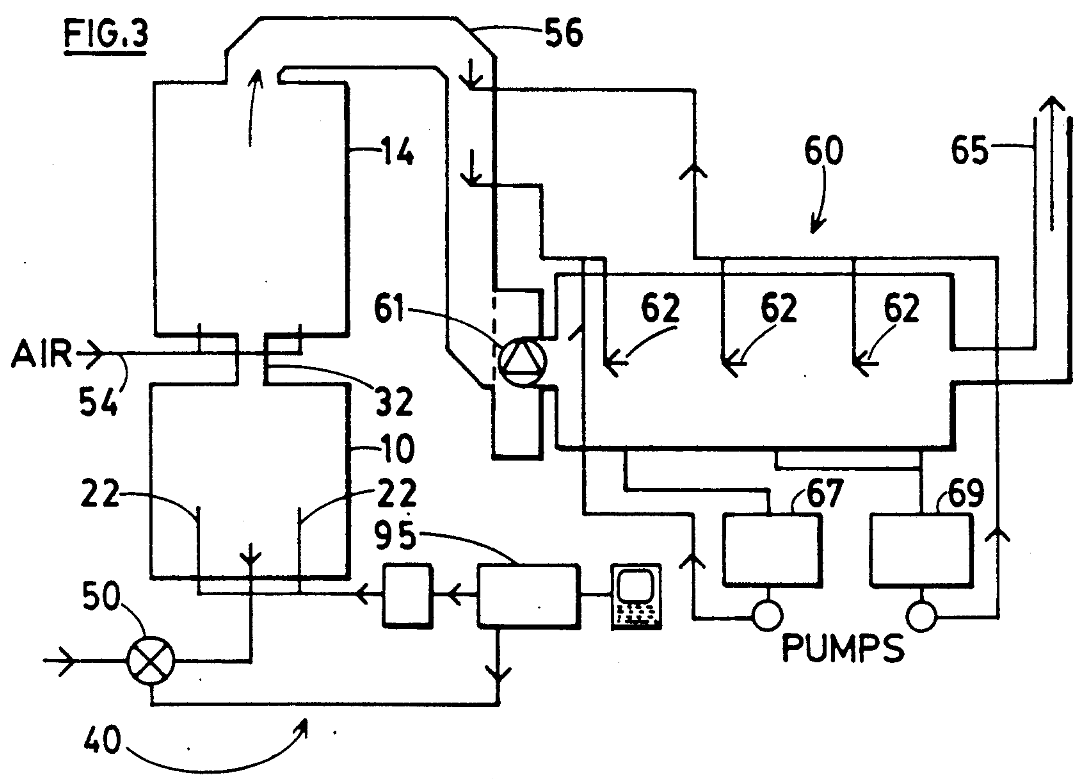
FIG. 3 is a diagramatic arrangement of a plant for carrying out the process.

Referring to FIG. 3, the system 40 is shown schematically, with reduction chamber 10 supporting combustion chamber 14. Feed of waste-with-liquid or liquids such as PCB or PCB-containing sludge is fed by way of a controllable feed valve 50 to the inlets 21 of the nozzles 20 in chamber 10. The reduced gases pass by way of passage 32 to combustion chamber 14. Variable air inlet controls 54 permit regulation of combustion chamber 14, operating substantially at atmospheric pressure.

Exhaust gases leave by way of passage 56, passing through a scrubber system 60 centrifugal fan particulate removal apparatus 61, and cooling showers, shown schematically at 62, to leave by stack 65, to atmosphere. The subject system includes neutralizing water tank 67, cooling water tank 69, and associated pumps and controls.

The overall system does not preclude other types of scrubbers.

Figure 4:
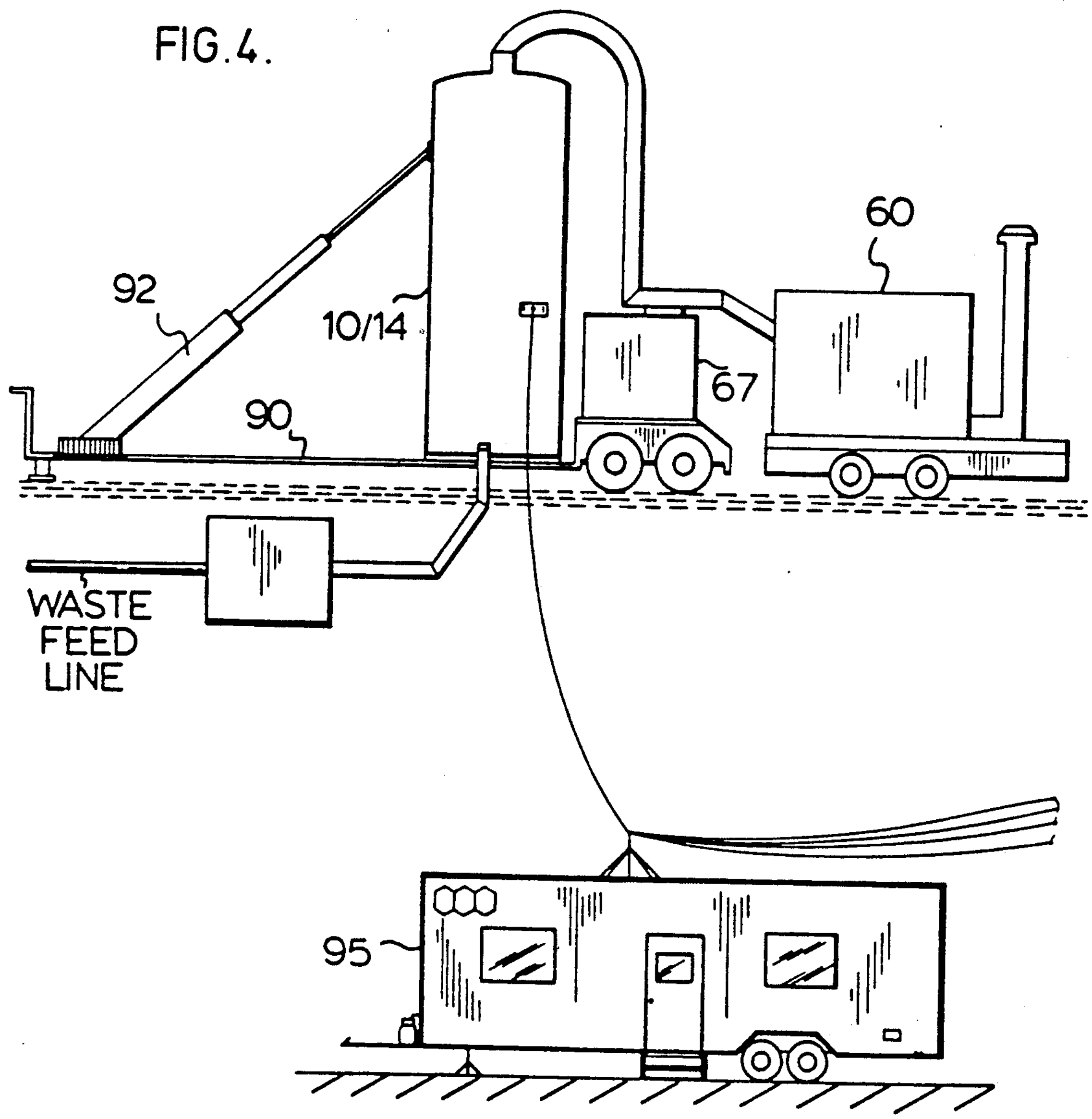
FIG. 4 is an impression of a mobile plant embodiment.

FIG. 4 is an artist's impression of the system as set up as a low-bed trailer 90, having a hydraulic actuator 92 for positioning the composite reduction/combustion vessel 10/14.

It is contemplated that steam from a steam generator may be utilized, both as the purging agent for the combined vessel 10/14, and as the pre-heating agent for the reduction and combustor chambers 10/14.

Process control instrumentation located in ancilliary trailer 95 provides automated control and back-up by way of instrumentation and controls (not shown).

Figure 5:
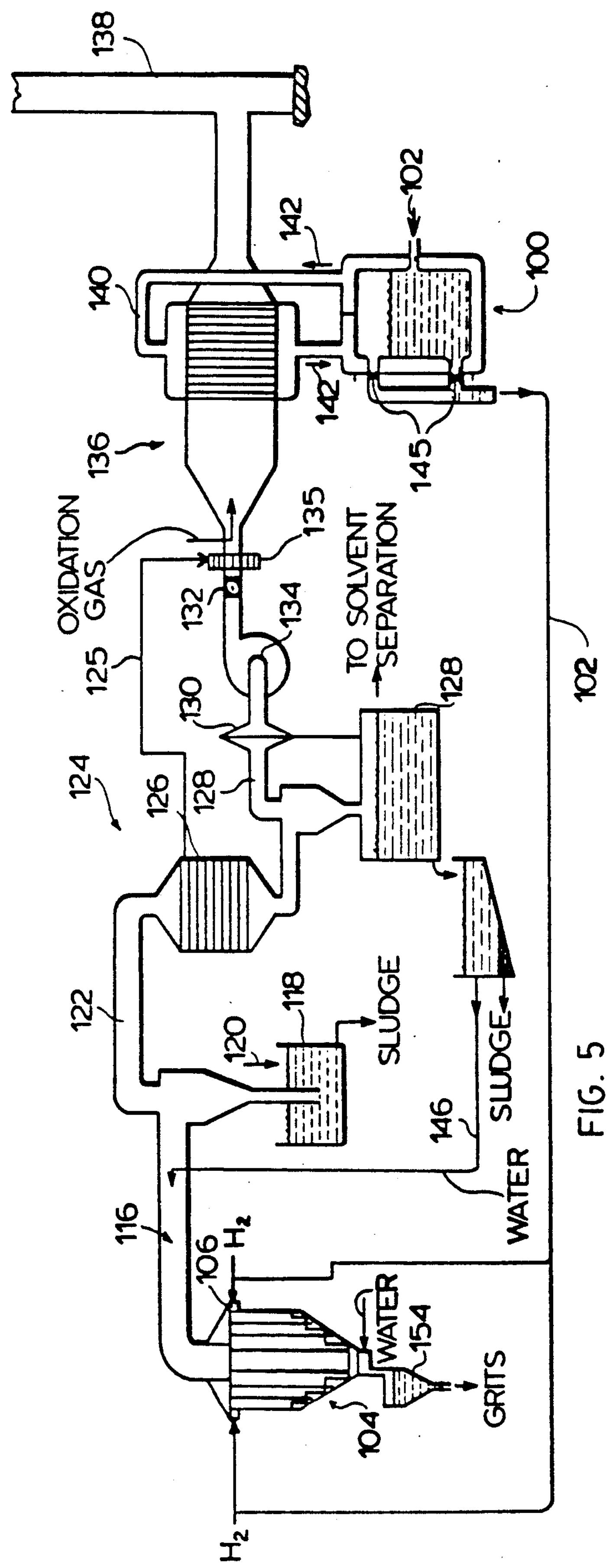
FIG. 5 is a schematic diagram of a process embodiment according to the invention.
Figure 6:
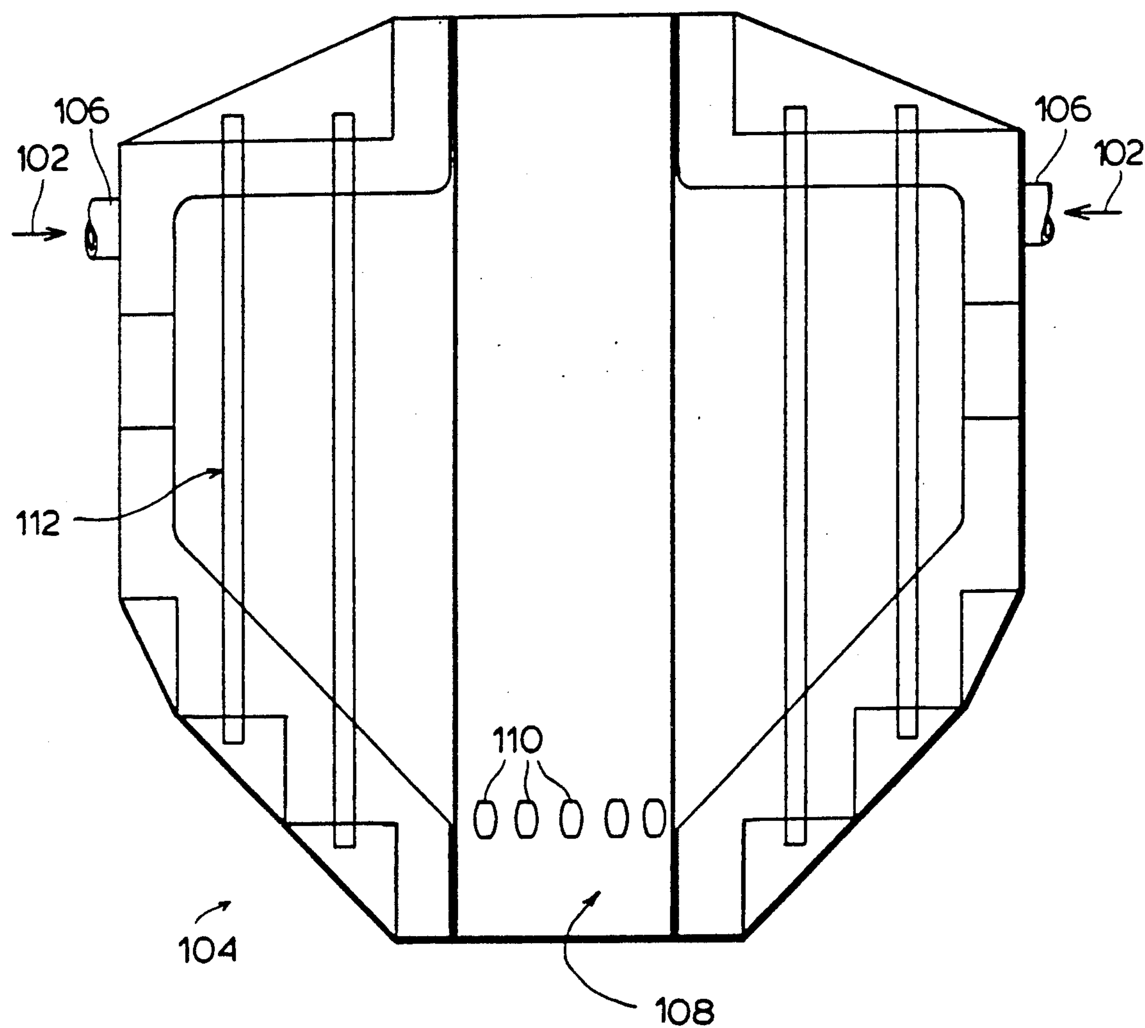
FIG. 6 is a schematic elevation, in diametrical section, of a reduction chamber having upper waste inlets and an inner tube.
Figure 7:
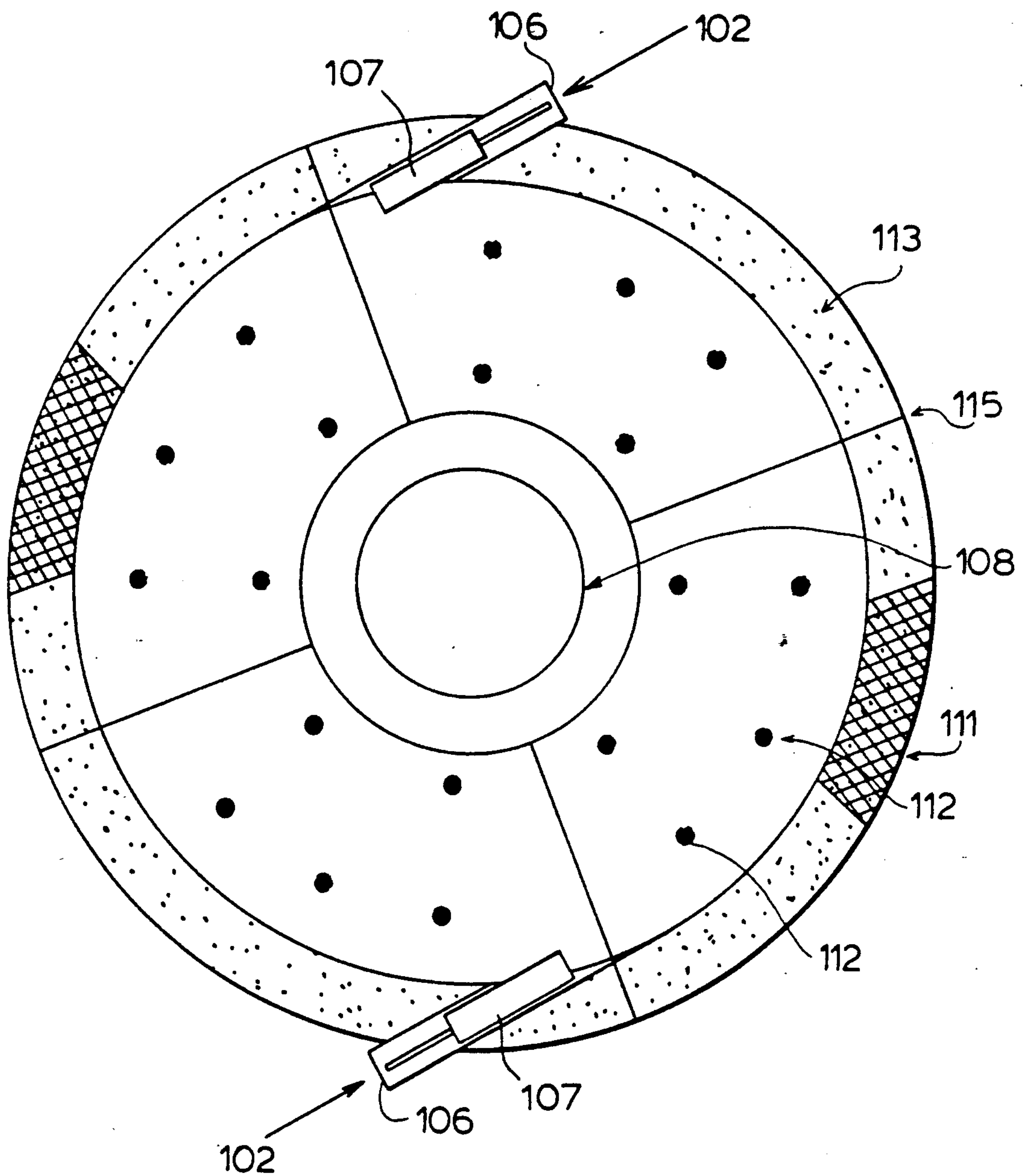
FIG. 7 is a horizontal cross-section take along 7—7 of FIG. 6.

Turning to FIG. 5, a process incorporating both reduced product recovery and water coolant recycling is illustrated schematically. Waste passes through preheater 100 as indicated by arrows 102 to be introduced into reduction vessel 104 through a nozzle 107 in which the waste is intimately mixed with a gaseous reducing agent, preferably hydrogen ($H_2$), through waste/reducing agent inlet ports 106 in the upper region of the reduction vessel. As shown in FIG. 6, vessel 104 comprises ceramic tube 108 with ports 110 located in its lower region. Glow bars 112 heat the vessel. A steady but low flow of gaseous reducing agent is introduced in the lower region of the vessel also, at inlet ports 114 to create a barrier which hinders entry of gaseous waste into water stream 152 which is further described below. Gaseous waste materials must travel into the lower region of the vessel to pass through ports 110 and up through the interior of tube 108 to proceed to a next step of the process.

As illustrated for the FIG. 5 embodiment, reduced gaseous waste materials next pass through retention zone 116 with subsequent introduction of water. The process illustrated in FIG. 5 is for the treatment of halogenated organic waste products, a reduction product of which is hydrogen halide gas. Water is injected as a mist and hydrogen halide gases dissolve and dissociate in the water droplets which condense and collect in tank 118. The dissolved gases make the water, that is aqueous liquid, acidic. Tank 118 is provided with entry means 120 for controlled introduction thereinto of an acid neutralization agent such as a bicarbonate salt, sodium hydroxide, calcium carbonate, etc. The acid in the aqueous liquid collected in tank 118 may thus be neutralized. Uncondensed gases, including both reduction products and water vapor next pass through zone 122 into cooling zone 124. The gases are cooled to a lower temperature and more gases condense. The cooling temperature of this zone is maintained within a few degrees, and usually above the freezing temperature of the condensed liquids which collect in vessel 128. Gases which remain uncondensed flow through zone 128, through demister 130 which is a baffle to catch any remaining small droplets or particles. Demister 130 is located so as to permit any matter caught thereby to flow into vessel 128.

According to this embodiment, the remaining gases next pass through flame arrest 132 to be oxidized in the final stages of the process. Propulsion of gases through the above process steps is aided by fan located in vicinity 134.

An oxidizing agent, such as air or oxygen is introduced to mix with the gases after passage through the flame arrest 132. Gases passing through the oxidation pre-heating zone located immediately after the flame arrest 132 are pre-heated prior to oxidation in oxidation zone 136. Oxidation zone 136 is heated, as may be required, with an oxidation gas such as natural gas or propane to promote oxidation of the remaining gases by the oxygen and the final products are released through stack 138.

In the FIG. 5 embodiment, a heat exchanger 126 is used in the cooling zone 124, the energy released being used in conjunction with heat exchanger 135 to provide heat for pre-heating of the gases in the oxidation preheating zone as indicated by arrow 125. Further, a closed zone 140 containing water is located to capture energy released during the oxidation step, the water being heated, so as to vaporize to steam, which is used to aid the pre-heating of waste in pre-heater 100. Movement of water and steam within zone 140 is indicated by arrows 142.

The process is operated with controlled throughput, as by control valves 145, and temperatures such that a major portion of the acidic gases produced by the reduction step are collected and neutralized in tank 118. This may be achieved by maintaining the temperature in the retention zone 116 in the neighborhood below the boiling point of water, that is, between about 70° C. and about 100° C. and preferably about 85° C. Some organic reduction products may or may not also be collected as liquid in tank 118 and this liquid thus may or may not require further treatment.

Cooling zone 124 is maintained at a significantly lower temperature than retention zone 116, in the neighborhood of and usually above the freezing temperature of the liquid being collected in vessel 128, that is up to about 20° C. and preferably about 5° C. As is known to those skilled in the art organic reduction products such as those which condense and collect in vessel 128 are readily separable, in large part, from the aqueous liquid which also condenses. That is, the liquid collected in vessel 128 will generally form two layers, a first aqueous layer comprising mainly water, and a second organic layer comprising mainly organic reduction products. The aqueous layer is separated and recycled as indicated by arrow 146 into retention zone 116. The remaining organic layer collected in vessel 128 may then be purified by distillation and/or other techniques to remove undesired impurities. The product of the purification may then be used or sold, etc.

It will be appreciated that the step of trapping acidic gases in the aqueous liquid collected in tank 118 is necessary to the extent that such gases are produced by reduction of the particular organic waste being used as feedstock for the process, and such a step may not be required in which case components of the gaseous stream from the reducing vessel would be directly condensed and cooled to a low temperature below about 20° C.

Waste material often comprises non-volatile particulate material which upon entry into vessel 104 at 106 will travel to the bottom of the vessel. Such material is here referred to as "grits" and the preferred embodiment provides a grits collection step.

Figure 8:
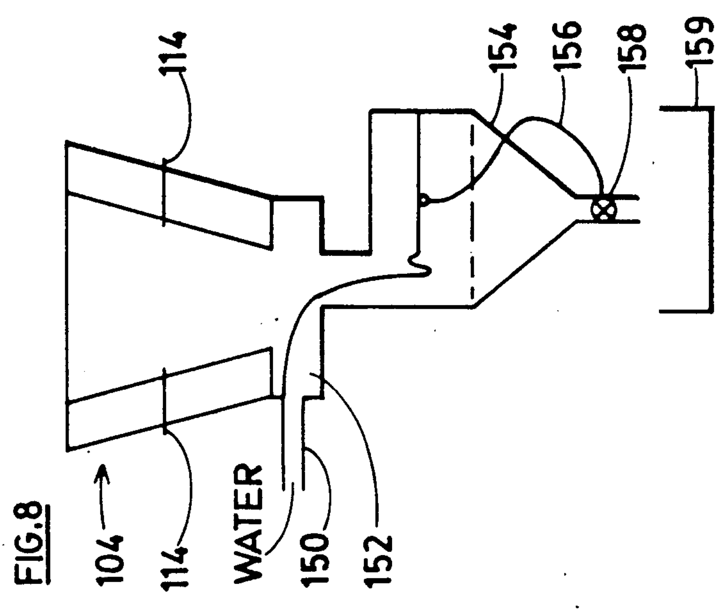
FIG. 8 is a schematic of a grit collection system for use with a reduction chamber.

As best seen in FIG. 8, hydrogen inlet ports, 114 are located in the lower region of vessel 104. A water ($H_2O$) inlet port 150 is located below the hydrogen inlet ports. Grits fall into the water stream 152 and are carried into grit collection tank 154. The level of water in tank 154 is monitored, for example, with the use of a mercury level switch 156 which automatically activates valve 158 to empty tank 154 when the water level has reached a particular height. Appropriate safeguards are employed to ensure that grits clogging the bottom of vessel 104, malfunction of switch 156, valve 158, etc., may be detected. The effluent emptied from tank 154 is appropriately treated and disposed of.

Figure 9:
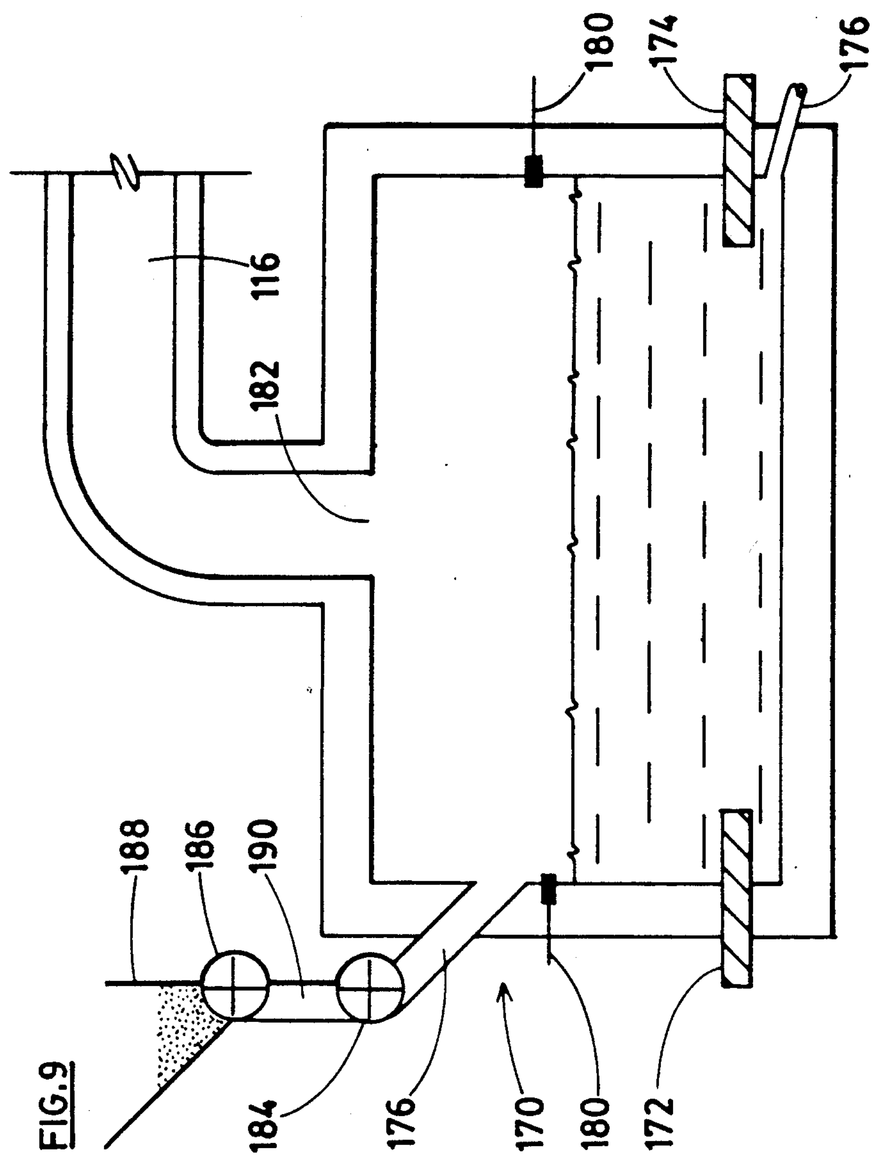
FIG. 9 is a schematic of an embodiment process employing a vitrification process in conjunction with a reduction process.

An alternative waste introduction system, particularly useful for ash or solid waste utilizes a vitrification process. With reference to FIG. 9, vitrification vessel 170 is provided with electrodes 172, 174, waste inlet port 176, slag outlet port 178, gaseous reducing agent inlets 180, and the interior of the vessel communicates with retention zone 116 through upper outlet 182. The waste inlet 176 is provided with rotating valves 184, 186. In use valve 186 is opened to permit waste material 188 to fall into passage 190 while valve 184 is closed. Valve 186 is then closed, valve 184 is opened and waste material contained in the passage falls through inlet 176 into vessel 170. Thus, an "air-lock" system is provided to preclude large amounts of oxygen from entering the vessel 170. It will be appreciated that the object of this valve arrangement is to preclude large explosive amounts of oxygen from contacting hydrogen within the vessel and other suitable "air-lock" systems may be employed.

In use, vitrification material is added to vessel 170 and may or may not be part of the waste being treated.

An electric current is passed from one electrode to the other via the material which is heated and vitrifies. Volatile organic material in the vitrification material is released into the overlying gaseous reducing atmosphere, usually hydrogen. The vitrification process itself may be controlled to provide sufficient heat for the reduction process.

Figure 10:
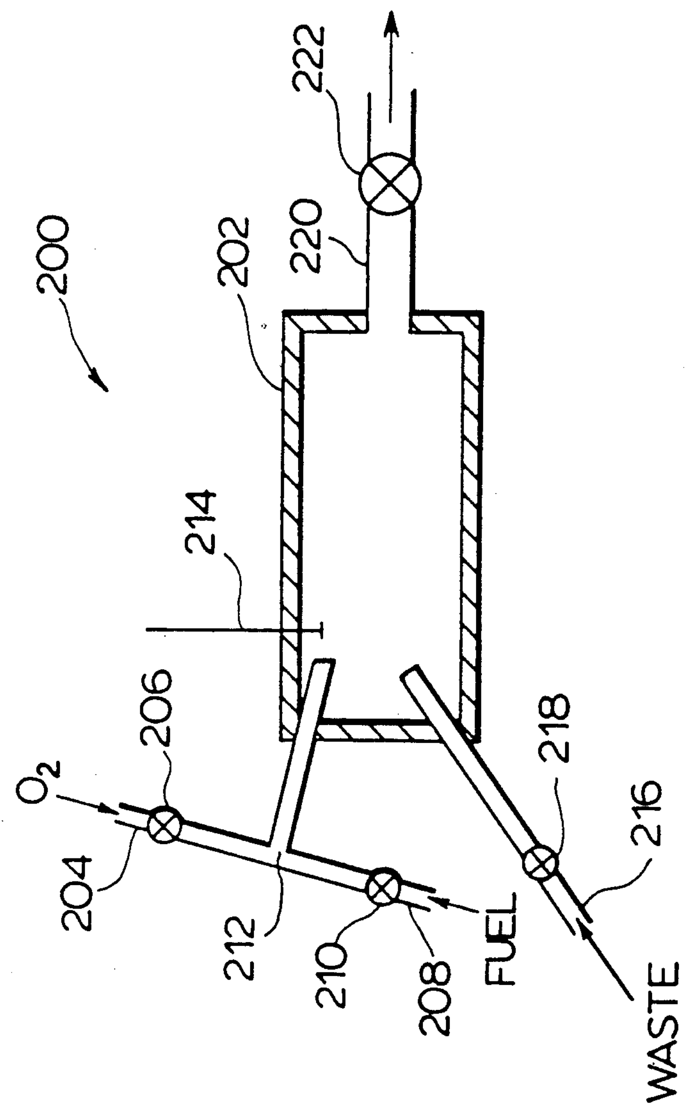
FIG. 10 is a schematic of a waste pre-heater system employing an $O_2$/fuel burner prior to waste reduction.

Under certain circumstances, it may be desirable to pre-heat the waste material in a waste pre-heating zone by means of an oxygen/fuel burner. Usually, the fuel would be a hydrocarbon fuel such as methane or natural gas. If, for instance, electricity is in short supply at the site where the waste is being destroyed it may therefore be desirable to pre-heat the waste to higher temperature than would be achievable through heat exchange as explained above. In such case, a pre-heater system such as that shown schematically in FIG. 10 may be used. The pre-heater system 200 comprises preheating chamber 202, oxygen entry means 204 with valve controller 206, fuel entry means 208 with valve controller 210, $O_2$/fuel mixing area 212, $O_2$/fuel ignition means 214 to provide a spark to initiate burning of the $O_2$/fuel mixture. There is waste entry means 216 with valve controller 218 and exit means 220 with exit control valve 222 to permit unidirectional entry of waste material to reduction vessel 104 via nozzle 107. In practice, fuel would be provided in slight stoichiometric excess to the oxygen so as not to promote oxidation of the waste and the waste would be pre-heated to a temperature below about 800° C. It would be possible, of course, for waste to be directed through pre-heater 100 (FIG. 5) prior to entry into pre-heater system 200.

The description of the foregoing embodiments illustrate the present invention and the invention is not limited by it, the invention being limited by the appended claims.

What is claimed is:

1. A process for the treatment of organic waste material comprising the steps of:

i) subjecting the waste material to direct chemical reduction by mixing the material with a reducing agent, subsequent reduction at a temperature above about 600° C. within a substantially oxygen-free isolated first zone;

ii) transferring reduced gaseous components to a cooling zone within the first zone;

iii) introducing a first aqueous component into the cooling zone, and cooling and condensing a first portion of the gaseous components therein into a liquid such that an aqueous liquid phase is formed and collecting the aqueous liquid phase in a collection zone; and iv) recycling a portion of the aqueous liquid phase by introducing the portion as the first aqueous component into the cooling zone.

2. The process as set forth in claim 1 further comprising un directionally transferring the reduced gaseous components from the cooling zone to a second zone and thereafter subjecting the gaseous components to oxidation with a gaseous oxidizing agent at a temperature above about 1000° C.

3. The process as set forth in claim 2 further comprising pre-heating the reduced gaseous components in an oxidation pre-heating zone within the second zone before subjecting the gaseous components to oxidation.

4. The process as set forth in claim 3 further comprising exchanging energy between the cooling zone and the oxidation pre-heating zone.

5. The process as set forth in claim 1 further comprising washing water through a lower region of the first zone and capturing grit material in the water.

6. The process as set forth in claim 1 further comprising pre-heating the organic waste material in a waste pre-heating zone to a heating temperature below about 200° C. and subsequently unidirectionally transferring the organic waste material to the first zone.

7. The process as set forth in claim 6 wherein the heating temperature is about 150° C.

8. The process as set forth in claim 6 further comprising unidirectionally transferring remaining reduced gaseous components from the first zone to a second zone and thereafter subjecting the gaseous components to oxidation with a gaseous oxidizing agent at a temperature above about 1000° C.

9. The process as set forth in claim 8 further comprising exchanging energy between the second zone and the waste pre-heating zone.

10. The process as set forth in claim 1 further comprising vitrifying the waste material within the first zone.

11. The process as set forth in claim 1 further comprising maintaining the cooling zone at a temperature from about 0° C. to about 20° C.

12. The process as set forth in claim 11 further comprising maintaining the cooling zone at a temperature of about 5° C.

13. The process as set forth in claim 11 further comprising introducing the aqueous component into a retention zone within the first zone and condensing a second portion of the gaseous components therein such that from about one third to about two thirds of the aqueous component is condensed and collecting condensed components in a neutralizing zone within the first zone and subsequently cooling and condensing the first aqueous portion.

14. The process as set forth in claim 13 further comprising condensing the second portion of the gaseous components such that about one half of the aqueous component is condensed.

15. The process as set forth in claim 11 further comprising introducing the aqueous component into a retention zone within the first zone and condensing a second portion of the gaseous components therein at a temperature from about 70° C. to about 100° C., collecting condensed components in a neutralizing zone within the first zone and subsequently cooling and condensing the first aqueous portion.

16. The process as set forth in claim 15 further comprising condensing the second portion of the gaseous components at a temperature of about 85° C.

17. The process as set forth in claim 1 wherein the gaseous reducing agent is selected from hydrogen, ammonia, natural gas, methane, propane, or water vapor, or a mixture of the agents.

18. The process as set forth in claim 1 wherein the gaseous reducing agent is hydrogen.

19. The process as set forth in claim 16, including the prior step of purging at least the first zone of oxygen-containing gases.

20. The process as set forth in claim 1 wherein the reduction is carried out at a temperature of from about 600° C. to about 1100° C.

21. The process as set forth in claim 1 wherein the reduction is carried out at a temperature of from about 700° C. to about 900° C.

22. The process as set forth in claim 1 wherein the reduction is carried out at a temperature of from about 800° C. to about 900° C.

23. The process as set forth in claim 1 wherein the waste material is subjected to reduction within the first zone over a residence time greater than about 0.1 seconds.

24. The process as set forth in claim 1 wherein the waste material is subjected to reduction over a residence time of from about 0.1 seconds to about 45 seconds.

25. The process as set forth in claim 1 wherein the waste material is subjected to reduction over a residence time of about 5 seconds.

26. The process as set forth in claim 1 wherein the reduction is carried out with a gaseous reducing agent in the presence of a metal catalyst.

27. The process as set forth in claim 23 wherein the metal catalyst is selected from iron, nickel, zinc or tin catalyst, or mixtures thereof.

28. The process a set forth in claim 23 wherein the metal catalyst is iron filings, powdered zinc, powdered nickel or powdered tin.

29. The process as set forth in claim 1 wherein a hot reaction mixture obtained during reduction is at a temperature of from about 600° C. to about 1000° C. prior to introducing the first aqueous component.

30. The process as set forth in claim 1 wherein a hot reaction mixture obtained during reduction is at a temperature of from about 800° C. to about 900° C. prior to introducing the first aqueous component.

31. The process as set forth in claim 1 wherein the organic waste material is in the form of a liquid, a pumpable sludge, a fine particulate slurry, pulverized solid material, an aqueous sediment or shredded or particulate organic solid material and inorganic material contaminated with organic waste material.

32. The process as set forth in claim 1 wherein the organic waste material contains halogenated or non-halogenated organic compounds.

33. The process as set forth in claim 1 wherein the organic waste material contains organic compounds selected from the group consisting of halogenated biphenyls, halogenated benzenes, halogenated phenols, halogenated cycloalkanes, halogenated alkanes, halogenated dioxins, halogenated dibenzofurans, halogenated alkenes, halogenated terphenyls, halogenated polyaromatic hydrocarbons, chlorinated alkenes, gaseous mixtures thereof, aerosol mists, and mixtures thereof.

34. The process as set forth in claim 1 further comprising pre-heating the organic waste material to a temperature below about 800° C. by ignition of fuel and oxygen in the presence of the waste material in a waste pre-heating zone wherein the fuel is in stoichiometric excess of the oxygen and subsequently unidirectionally transferring the organic waste material to the first zone.

35. The process as set forth in claim 34 wherein the fuel is methane or natural gas or a mixture thereof.

36. A process for the destruction of organic waste material which comprises: subjecting said waste material to direct chemical reduction, by initial direct intimate mixing with a gaseous reducing agent; subsequent reduction at a temperature above about 600° C. within an oxygen-free isolated first zone; transferring the thus reduced gases to a condensing zone within the first zone; introducing an aqueous component into the condensing zone and condensing a portion of the gaseous components therein into a liquid such that an aqueous liquid phase is formed; collecting the aqueous liquid phase; and transferring remaining reduced gaseous components to a second zone, and thereafter subjecting the gaseous mixture thus obtained to oxidation with a gaseous oxidizing agent at a temperature above about 1000° C.

37. A system for the destruction of organic waste material, having a reducing vessel; first gas entry means for admitting a purge gas within the vessel to provide a substantially oxygen-free environment in the vessel heating means for raising the temperature within the vessel to a temperature above a predetermined minimum temperature for reduction of a predetermined group of the organic waste material; feed means for feeding the organic waste material into the reducing vessel such that the organic waste material is volatized within a mixing zone within the vessel; first gas admission nozzle means for admitting a reducing gas to mix with the organic waste material in the mixing zone, whereby the waste material is effectively reduced to form reduced gaseous material.

38. The system as set forth in claim 37, the reducing vessel including an outlet located at an elevated location therein, for the outward passage therethrough of the gaseous material.

39. The system as set forth in claim 38, wherein the feed means is for organic waste material in liquid and particulate form and the first gas admission nozzle means has a body portion, an inlet connected with the feed means, to receive the waste material, having an axially directed nozzle to discharge the waste material as a jet within the body portion, the first gas admission nozzle means being inwardly directed to discharge the reducing gas in impacting relation with the jet.

40. The system as set forth in claim 38, having a combustor vessel adjacent the reducing vessel; and flow controlling transfer passage means connecting the reducing vessel outlet to the combustor vessel, to transfer the reduced gaseous material unidirectionally from the reducing vessel to the combustor vessel, for combustion therein.

41. The system as set forth in claim 40, including scrubber means for receiving fluid combustion products from the combustor vessel, and scrubbing the products with an alkaline solution of predetermined pH value, to substantially neutralize the acidic content of the combustion products.

42. The system as set forth in claim 40, including electrical energy generating means for receiving hot gases from the combustion in electrical generating relation therewith.

43. The system as set forth in claim 42, wherein the energy generating means includes a boiler to receive the hot gases, and is connected in driving relation with an alternating current generator.

44. The system as set forth in claim 39, having a combustor vessel adjacent the reducing vessel; and flow controlling transfer passage means connecting the reducing vessel outlet to the combustor vessel, to transfer the reduced gaseous material unidirectionally from the reducing vessel to the combustor vessel, for combustion therein.

45. The system as set forth in claim 44 wherein the feed means and the first gas admission nozzle means are located in an upper region of the reducing vessel and, the reducing vessel has a baffling means located therewith so as to provide an extended passage between the feed means and the flow controlling transfer passage means.

46. The system as set forth in claim 45 including a cooling vessel with first cooling means adjacent the reducing vessel and transfer passage means connecting the reducing vessel outlet to the cooling vessel, to transfer the reduced gaseous material from the reducing vessel to the cooling vessel for a cooling step therein.

47. The system as set forth in claim 46 including a neutralizing tank connected to the transfer passage means and located between the reducing vessel outlet and the cooling vessel, the neutralizing tank comprising liquid injection means, liquid collection means and neutralizing agent feed means.

48. The system as set forth in claim 38 including a cooling vessel with first cooling means adjacent the reducing vessel and first transfer passage means connecting the reducing vessel outlet to the cooling vessel, to transfer the reduced gaseous material from the reducing vessel to the cooling vessel, for a cooling step therein.

49. The system as set forth in claim 48 wherein the cooling vessel is provided with liquid injection means and liquid collection means located below the injection means and transfer means for transfer of liquid from the collection means to the injection means.

50. The system as set forth in claim 49 having a combustor vessel adjacent the cooling vessel; and flow controlling transfer passage means connecting the cooling vessel to the combustor vessel, to transfer the reduced gaseous material unidirectionally from the cooling vessel to the combustor vessel, for combustion therein.

51. The system as set forth in claim 50 having an oxidation pre-heater vessel located between the flow controlling transfer passage means and the combustor vessel.

52. The system as set forth in claim 51 having a first heat transfer means located to transfer energy released during the cooling step to the oxidation pre-heater vessel.

53. The system as set forth in claim 52 including a neutralizing tank, connected to the first transfer passage means and located between the reducing vessel outlet and the cooling vessel, the neutralizing tank comprising liquid injection means, liquid collection means and neutralizing agent feed means.

54. The system as set forth in claim 53 including a waste pre-heater vessel for the organic waste material connected to the feed means and having pre-heating means whereby the organic waste material may be pre-heated prior to passage through the feed means.

55. The system as set forth in claim 54 wherein the pre-heating means comprises a second heat transfer means connected to the combustor vessel and the second pre-heater vessel.

56. The system as set forth in claim 55 wherein the second heat transfer means comprises a water and steam circulation means.

57. The system as set forth in claim 38 including a neutralizing tank, and transfer passage means connecting the reducing vessel outlet to the neutralizing tank, to transfer the reduced gaseous material from the reducing vessel to the neutralizing tank, the neutralizing tank comprising liquid injection means liquid collection means and neutralizing agent feed means.

58. The system as set forth in claim 37 wherein the heating means comprises vitrification means.

59. The system as set forth in claim 37 having a waste pre-heater vessel with pre-heating means for the organic waste material connected to the feed means whereby the organic waste material may be pre-heated prior to passage through the feed means.

60. The system as set forth in claim 59 having an outlet located at an elevated location in the reducing vessel, for outward passage therethrough of the gaseous material and having a combustor vessel adjacent the reducing vessel; and flow controlling transfer passage means connecting the reducing vessel outlet to the combustor vessel, to transfer the reduced gaseous material unidirectionally from the reducing vessel to the combustor vessel for exothermic combustion therein.

61. The system as set forth in claim 60 wherein the pre-heating means comprise heat transfer means to transfer energy released during the exothermic combustion to the waste pre-heater vessel.

62. The system as set forth in claim 61 wherein the heat transfer means comprises a water and steam circulation means.

63. The system as set forth in claim 45 having a grits collection means located below the feed means and the baffling means.

64. The system as set forth in claim 63 wherein the grits collection means comprises a liquid inlet port and a collection tank.

65. The system as set forth in claim 64, the collection tank having a lower valve means to transfer liquid and grits from the tank.

66. The system of claim 34 further comprising a waste pre-heater chamber for the organic waste material connected to the feed means and having pre-heating means whereby the organic waste material may be pre-heated prior to passage through the feed means.

67. The system of claim 66 wherein the pre-heating means comprises an $O_2$/hydrocarbon fuel burner.

* * * * *

UNITED STATES PATENT AND TRADEMARK OFFICE

CERTIFICATE OF CORRECTION

PATENT NO. : 5,050,511

DATED : September 24, 1991

INVENTOR(S) : Hallett et al.

It is certified that error appears in the above-identified patent and that said Letters Patent is hereby corrected as shown below:

Column 13, line 64:

Correct "un directionally" to read --unidirectionally--.

Column 16, line 16:

After "vessel", insert --;--.

Signed and Sealed this

Second Day of February, 1993

*Attest:*

STEPHEN G. KUNIN

*Attesting Officer*

*Acting Commissioner of Patents and Trademarks*